United States Patent [19]

Konoike et al.

[11] Patent Number: 4,585,744

[45] Date of Patent: Apr. 29, 1986

[54] DIELECTRIC CERAMIC COMPOSITION FOR MICROWAVE FREQUENCIES

[75] Inventors: Takehiro Konoike; Hiroshi Tamura, both of Nagaokakyo, Japan

[73] Assignee: Murata Manufacturing Co., Ltd., Japan

[21] Appl. No.: 678,651

[22] Filed: Dec. 6, 1984

[30] Foreign Application Priority Data

Dec. 6, 1983 [JP] Japan ................ 58-231159
Sep. 26, 1984 [JP] Japan ................ 59-200776

[51] Int. Cl.$^4$ ........................... C04B 35/00
[52] U.S. Cl. ................. 501/135; 501/134; 501/152
[58] Field of Search ........... 501/134, 135, 121, 136, 501/152

[56] References Cited

U.S. PATENT DOCUMENTS 3,268,783  8/1966  Saburi ................. 501/139
4,487,842 12/1984  Nomura et al. ........ 501/135

FOREIGN PATENT DOCUMENTS 5360544 11/1976  Japan.

OTHER PUBLICATIONS

F. Galasso and W. Darby, *J. Phys. Chem.* 66, 131 (1962).

*Primary Examiner*—William R. Dixon, Jr.
*Assistant Examiner*—Karl Group
*Attorney, Agent, or Firm*—Ostrolenk, Faber, Gerb & Soffen

[57] ABSTRACT

A dielectric ceramic composition for microwave frequencies comprises a solid solution of BaO, SnO$_2$, MgO and Ta$_2$O$_5$, said solid solution being represented by the general formula:

$$Ba(Sn_xMg_yTa_z)O_{7/2-x/2-3y/2}$$

where x, y and z are mole fractions of the respective components, $0.04 \leq x \leq 0.26$, $0.23 \leq y \leq 0.31$, $0.51 \leq z \leq 0.65$, and $x+y+z=1.00$.

9 Claims, 7 Drawing Figures

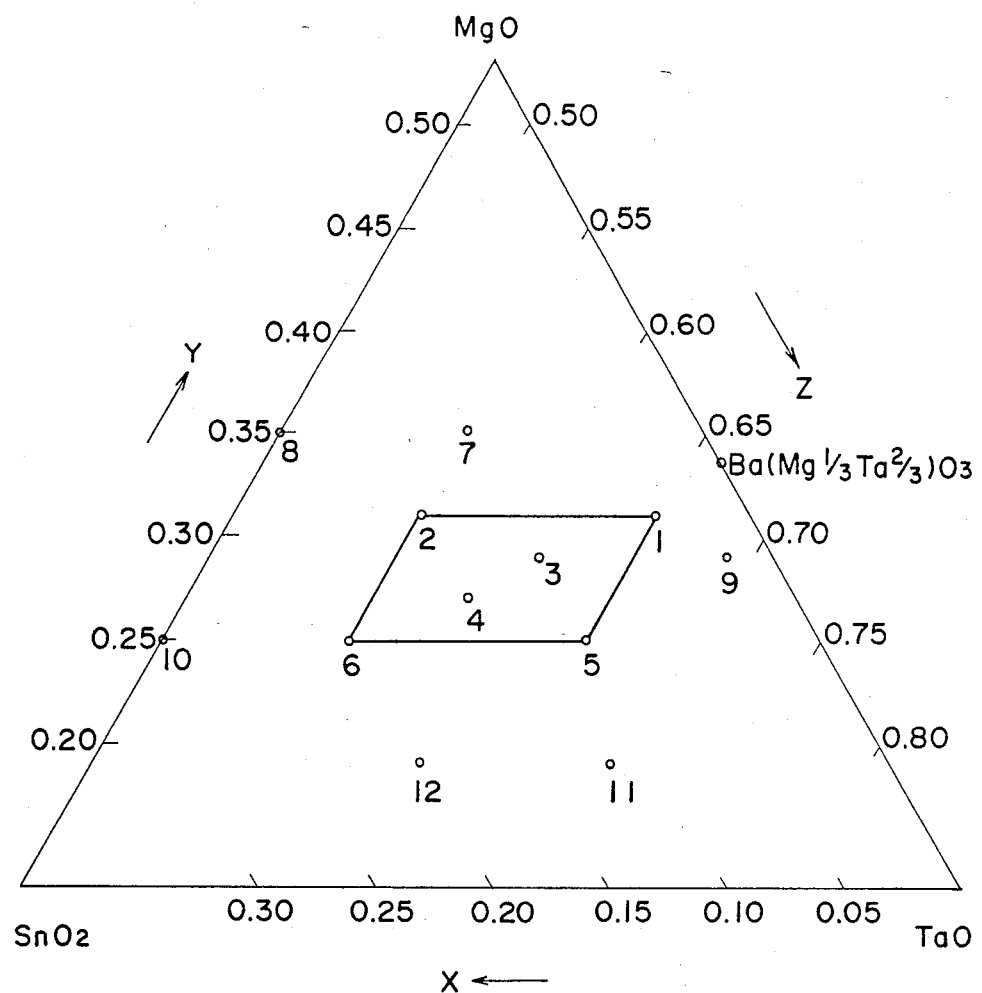

[111]
DIRECTION OF PEROVSKITE PSEUDOCELL 3  4  1  2

∘ B   • B'

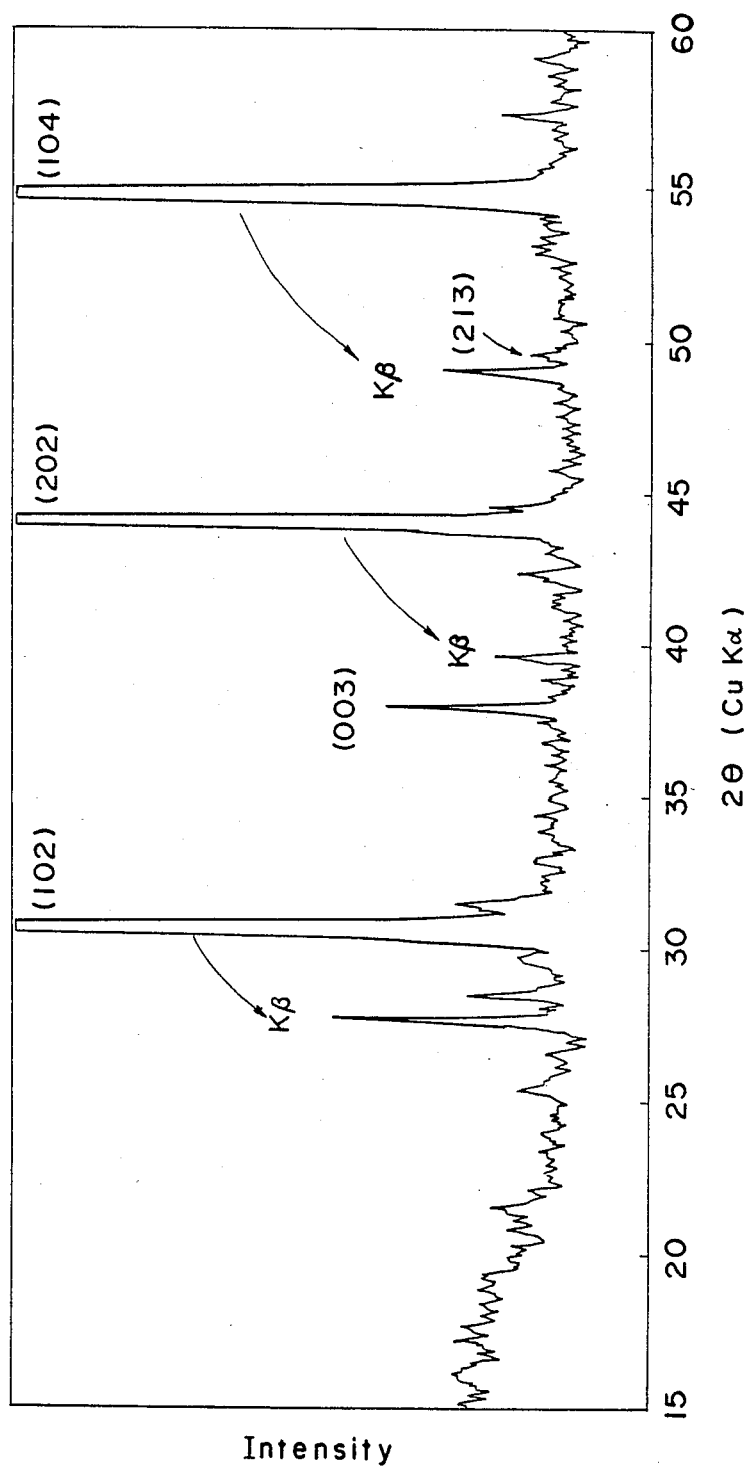

DIELECTRIC CERAMIC COMPOSITION FOR MICROWAVE FREQUENCIES

This invention relates to a dielectric ceramic composition for microwave frequencies and, more particularly, a dielectric ceramic composition which has a high Q value even in a frequency region of microwaves and millimetric waves.

In a microwave frequency region, various dielectric ceramics have been used for dielectric resonators, dielectric substrates for microwave-integrated circuits and the like because of their superior properties. Typical dielectric ceramics used for such a purpose include those of the systems $ZrO_2$-$SnO_2$-$TiO_2$, $BaO$-$TiO_2$ and $Ba(Zn,Ta)O_3$ which have a high dielectric constant of 20 to 40, a high quality factor (Q) of 2000 to 6000, and a low temperature coefficient of resonant frequency ($\tau_f$) of the order of 0 ppm/°C. even at 10 GHz. In recent years there have been trends to use higher frequencies in microwave systems, so that it has been desired to provide dielectric ceramics with a higher quality factor (Q).

In Japanese patent application Laid-open No. 53-60544, it has been proposed to use dielectric ceramics of a $Ba(Mg,Ta)O_3$ system as a dielectric material for microwave resonators. However, they cannot be used for future microwave systems being planned for higher frequencies because of their low Q and a large temperature coefficient of resonant frequency in a frequency region higher 10 MHz.

In the $Ba(Mg,Ta)O_3$ system, complete ordering is theoretically possible when a mole ratio of Mg to Ta in the B site is 1:2, as taught by F. Gallasso and J. Pyle in a literature "Ordering in compounds of the $A(B'_{0.3}$-$3Ta_{0.67})O_3$ type", *Inorganic Chemistry*, 2(1963), p 482-484. In this report, there has been disclosed that the compound $Ba(Mg_{\frac{1}{3}}Ta_{\frac{2}{3}})O_3$ has a hexagonal super structure, as shown in FIG. 2(a), because the two B-site ions, Mg (1) and Ta(2) ions were of an ordered configuration as in FIG. 2(b). Numerals 3 and 4 in FIG. 2(a) show Ba and O, respectively. This is supported by X-ray diffraction patterns of powder of $Ba(Mg_{\frac{1}{3}}Ta_{\frac{2}{3}})O_3$ which show diffraction peaks depending on the hexagonal super structure, as indicated by asterisks (*) in FIG. 3(a).

However, the composition $Ba(Mg_{\frac{1}{3}}Ta_{\frac{2}{3}})O_3$ is a material which is very difficult to sinter to get the sufficiently dense ceramics.

If the composition of $Ba(Mg_{\frac{1}{3}}Ta_{\frac{2}{3}})O_3$ was produced by firing under practical conditions, for example, at 1550° C. for 4 hours, it has a low Q value and a large temperature coefficient of resonant frequency as shown in Table 1. In this table, values of the dielectric constant ($\epsilon$), Q and the temperature coefficient of resonant frequency ($\tau_f$) are results measured at 10 GHz.

TABLE 1

| composition | $\epsilon$ | Q | $\tau_f$(ppm/°C.) |
|---|---|---|---|
| $Ba(Mg_{\frac{1}{3}}Ta_{\frac{2}{3}})O_3$ | 25.0 | 6000 | 7 |

Accordingly, it is not possible to put the compositions of the system $Ba(Mg,Ta)O_3$ into practical use.

It is therefore an object of the present invention to provide a dielectric ceramic composition for microwave frequencies having a high dielectric constant, a high Q value and a small temperature coefficient of resonant frequency around 0 ppm/°C. in a frequency region of microwaves and millimetric waves.

Another object of the present invention is to provide a dielectric ceramic composition for microwave frequencies having any desired temperature coefficient of resonant frequency around 0 ppm/°C.

According to the present invention, the these objects are achieved by providing a dielectric ceramic composition for microwave frequencies comprising a solid solution composed of BaO, $SnO_2$, MgO and $Ta_2O_5$, said solid solution being represented by the general formula:

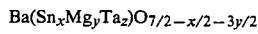
$Ba(Sn_xMg_yTa_z)O_{7/2-x/2-3y/2}$ where x, y and z are mole fractions of the respective components, $0.04 \leq x \leq 0.26$ (preferably, $0.04 \leq x \leq 0.20$), $0.23 \leq y \leq 0.31$ (preferably, $0.25 \leq y \leq 0.31$), $0.51 \leq z \leq 0.65$ (preferably, $0.55 \leq z \leq 0.65$), and $x+y+z=1.00$.

According to one preferred embodiment, the composition consists essentially of a solid solution composed of BaO, $SnO_2$, MgO and $Ta_2O_5$, said solid solution being represented by the general formula:

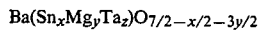
$Ba(Sn_xMg_yTa_z)O_{7/2-x/2-3y/2}$ where x, y and z are mole fractions of the respective components, $0.04 \leq x \leq 0.20$, $0.25 \leq y \leq 0.31$, $0.55 \leq z \leq 0.65$, and $x+y+z=1.00$.

According to another preferred embodiment, a dielectric ceramic composition for microwave frequencies consists essentially of a main component comprising a solid solution composed of BaO, $SnO_2$, MgO and $Ta_2O_5$, the solid solution being represented by the general formula:

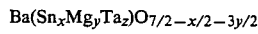
$Ba(Sn_xMg_yTa_z)O_{7/2-x/2-3y/2}$ where x, y and z are mole fractions of the respective components, $0.04 \leq x \leq 0.20$, $0.25 \leq y \leq 0.31$, $0.55 \leq z \leq 0.65$, and $x+y+z=1.00$; and an additive composed of at least one lanthanide oxide, a content of the additive being not more than 10 mole % in terms of $Me_2O_3$ (where Me is at least one lanthanide).

According to still another preferred embodiment, a dielectric ceramic composition comprises a solid solution composed of BaO, $SnO_2$, MgO and $Ta_2O_5$, said solid solution being represented by the general formula:

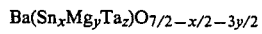
$Ba(Sn_xMg_yTa_z)O_{7/2-x/2-3y/2}$ where x, y and z are mole fractions of the respective components, $0.04 \leq x \leq 0.20$, $0.25 \leq y \leq 0.31$, $0.55 \leq z \leq 0.65$, and $x+y+z=1.00$, not more than 70 atomic % of Mg being replaced with Ni and/or Co.

According to further preferred embodiment, a dielectric ceramic composition for microwave frequencies consists essentially of a main component comprising a solid solution composed of BaO, $SnO_2$, MgO and $Ta_2O_5$, said solid solution being represented by the general formula:

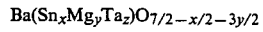
$Ba(Sn_xMg_yTa_z)O_{7/2-x/2-3y/2}$ where x, y and z are mole fractions of the respective components, $0.04 \leq x \leq 0.20$, $0.25 \leq y \leq 0.31$, $0.55 \leq z \leq 0.65$, and $x+y+z=1.00$, not more than 70 atomic % of Mg in the main component being replaced with Ni and/or Co; and an additive consisting essentially of at least one lanthanide oxide, a content of the additive being not less than 10 mole % in terms of $Me_2O_3$.

According to the present invention it is possible to produce dielectric ceramic compositions which have a high dielectric constant, high Q and a small temperature coefficient of resonant frequency even at microwave frequencies higher than 10 MHz. It is also possible to produce dielectric ceramic compositions for high frequencies with any desired temperature coefficient of resonant frequency around 0 ppm/°C. The dielectric ceramic compositions according to the present invention are useful for dielectric resonators, dielectric control rods, dielectric substrates for microwave-integrated circuits, and the like.

The reasons why mole fractions of Sn, Mg and Ta, i.e., x, y and z in the general formula $Ba(Sn_xMg_yTa_z)O_{7/2-x/2-3y/2}$ have been limited to values within the above respective ranges are as follows.

If x is less than 0.04 or if x exceeds 0.26, the quality factor (Q) becomes low. For these reasons, x has been limited to a value within the range of from 0.04 to 0.26, preferably, from 0.04 to 0.20. If y is less than 0.23, the quality factor (Q) becomes low and the temperature coefficient of resonant frequency becomes large in a positive side. If y exceeds 0.31, sintering of the composition becomes difficult. For these reasons, y has been limited to a value within the range of from 0.23 to 0.31, preferably, from 0.25 to 0.31. If z is less than 0.55, sintering of the composition becomes difficult and the quality factor (Q) becomes low. If z exceeds 0.65, the quality factor (Q) becomes low. Thus, z has been limited to a value within the range of from 0.51 to 0.65, , preferably, from 0.55 to 0.65.

A part of Mg in $Ba(Sn_xMg_yTa_z)O_{7/2-x/2-3y/2}$ may be replaced with Ni and/or Co to control the temperature coefficient of resonant frequency. Since the partial replacement of Mg with Ni and/or Co shifts the temperature coefficient of resonant frequency towards the negative side, and its shift increases with increasing an amount of the replacement of Mg with Ni and/or Co, it is possible to produce dielectric ceramics with any desired temperature coefficient of resonant frequency which are useful as temperature-compensating dielectric ceramics. However, if the replacement of Mg with Ni and/or Co exceeds 70 atomic % of Mg, the temperature coefficient of resonant frequency becomes too large in the negative side. Also, excess replacement of Mg with Ni and/or Co causes lowering of sintering property, or decrease of Q. Thus, the partial replacement of Mg with Ni and/or Co has been limited to the amount not more than 70 atomic %.

At least one lanthanide oxide is incorporated into the ceramic composition to improve the quality factor (Q). However, addition exceeding 10 mole % causes lowering of Q. Thus, the amount of the additive has been limited to a value not more than 10 mole %. It is, however, preferred to incorporate at least one lanthanide oxide in an amount of 0.1 mole % and above.

The invention will be further apparent from the following description with reference to preferred embodiments thereof and the accompanying drawings.

BRIEF DESCRIPTION OF THE DRAWINGS

FIG. 1 is a diagram showing the preferred compositional area of the components, SnO, MgO and $Ta_2O_3$ in a $Ba(Sn_xMg_yTa_z)O_{7/2-x/2-3y/2}$ system according to the present invention;

FIG. 3(b) is a graph showing X-ray diffraction patterns for $Ba(Sn_{0.10}Mg_{0.29}Ta_{0.61})O_3$.

FIG. 4(a) is a graph showing X-ray diffraction patterns for $Ba(Sn_{0.10}Mg_{0.29}Ta_{0.61})O_3$ around $2\theta = 90°$.

EXAMPLES

Using highly purified (purity: 99.8–99.9%) $BaCO_3$, $SnO_2$, $MgCO_3$ and $Ta_2O_5$ as raw materials, there were prepared mixtures to produce ceramics each having a composition shown in Table 2. The resultant mixture was put into a ball mill together with water and then mixed by the wet process for 2 hours. After drying, the mixture was calcined at 1,200° C. for 2 hours. The thus obtained presintered body was crushed, ball-milled together with water and an organic binder for 2 hours and then dried.

The resultant powder was passed through a 50 mesh sieve to obtain minus sieve, and then pressed into disks with a diameter of 10 mm and a thickness of 5 mm under a pressure of 2000 kg/cm². The disks were fired in air at 1550° C. for 4 hours to produce specimens of ceramics.

Each of the resultant specimens was subjected to measurements of the dielectric constant ($\epsilon$), quality factor (Q) and temperature coefficient of resonant frequency ($\tau_f$). The dielectric constant and Q were measured at 10 GHz by a well-known dielectric resonator method. The temperature coefficient of resonant frequency was determined by the following equation:

$$\tau_f = \frac{1}{f_o} \cdot \frac{\Delta f}{\Delta T} = \frac{1}{f_{25}} \cdot \frac{(f_{85} - f_{25})}{(85 - 25)}$$

where $f_{25}$ is a resonant frequency at 25° C.

$f_{85}$ is a resonant frequency at 85° C.

Results are shown in Table 2. In the table, asterisked specimens are those having a composition beyond the scope of the present invention. The properties of specimens Nos. 7 and 8 could not be measured since these specimens were not sintered. Numerals in FIG. 1 correspond to specimen numbers in Table 2, respectively.

TABLE 2

| Specimen No. | $Ba(Sn_xMg_yTa_z)O_{7/2-X/2-3Y/2}$ | | | $\epsilon$ | Q | $\tau_f$ (ppm/°C.) |
|---|---|---|---|---|---|---|
| | X | Y | Z | | | |
| 1 | 0.04 | 0.31 | 0.65 | 23.5 | 8600 | 5 |
| 2 | 0.14 | 0.31 | 0.55 | 23.4 | 8400 | 2 |
| 3 | 0.10 | 0.29 | 0.61 | 24.4 | 8800 | 3 |
| 4 | 0.14 | 0.27 | 0.59 | 24.8 | 10800 | −1 |
| 5 | 0.10 | 0.25 | 0.65 | 26.5 | 8200 | 7 |
| 6 | 0.20 | 0.25 | 0.55 | 25.5 | 8900 | −4 |
| 7* | 0.10 | 0.35 | 0.55 | Not sintered | | |
| 8* | 0.18 | 0.35 | 0.47 | Not sintered | | |
| 9* | 0.02 | 0.29 | 0.69 | 25.8 | 3800 | 18 |
| 10* | 0.28 | 0.25 | 0.47 | 21.1 | 3200 | 2 |
| 11* | 0.12 | 0.19 | 0.69 | 30.1 | 2400 | 40 |
| 12* | 0.20 | 0.19 | 0.61 | 28.1 | 5300 | 29 |

As can be seen from the results shown in Table 2, the composition according to the present invention have a high dielectric constant, a small temperature coefficient of resonant frequency and a high Q value. The specimen No. 3 according to the present invention has a Q value of 10800 which is about 1.8 times as high as that of the $Ba(Mg_{\frac{1}{3}}Ta_{\frac{2}{3}})O_3$ compositions shown in Table 1.

Figure 2A:
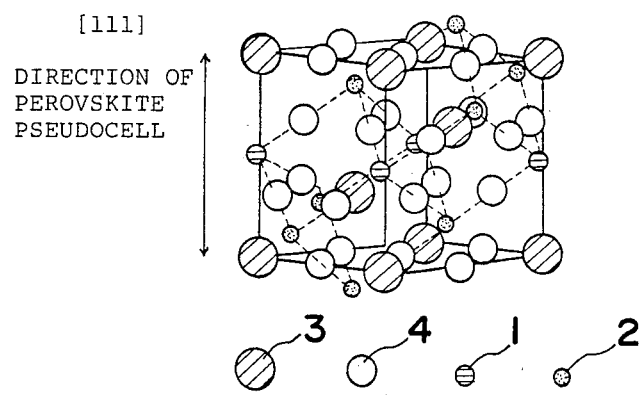
FIG. 2(a) is a schematic view of a crystal structure of $Ba(Mg_{\frac{1}{3}}Ta_{\frac{2}{3}})O_3$ of the prior art.
Figure 2B:
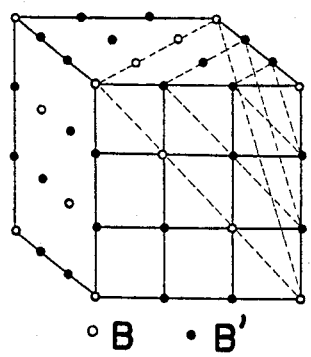
FIG. 2(b) is a schematic view of a crystal structure of $Ba(Mg_{\frac{1}{3}}Ta_{\frac{2}{3}})O_3$ that shows an ordered configuration of Mg and Ta.
Figure 3A:
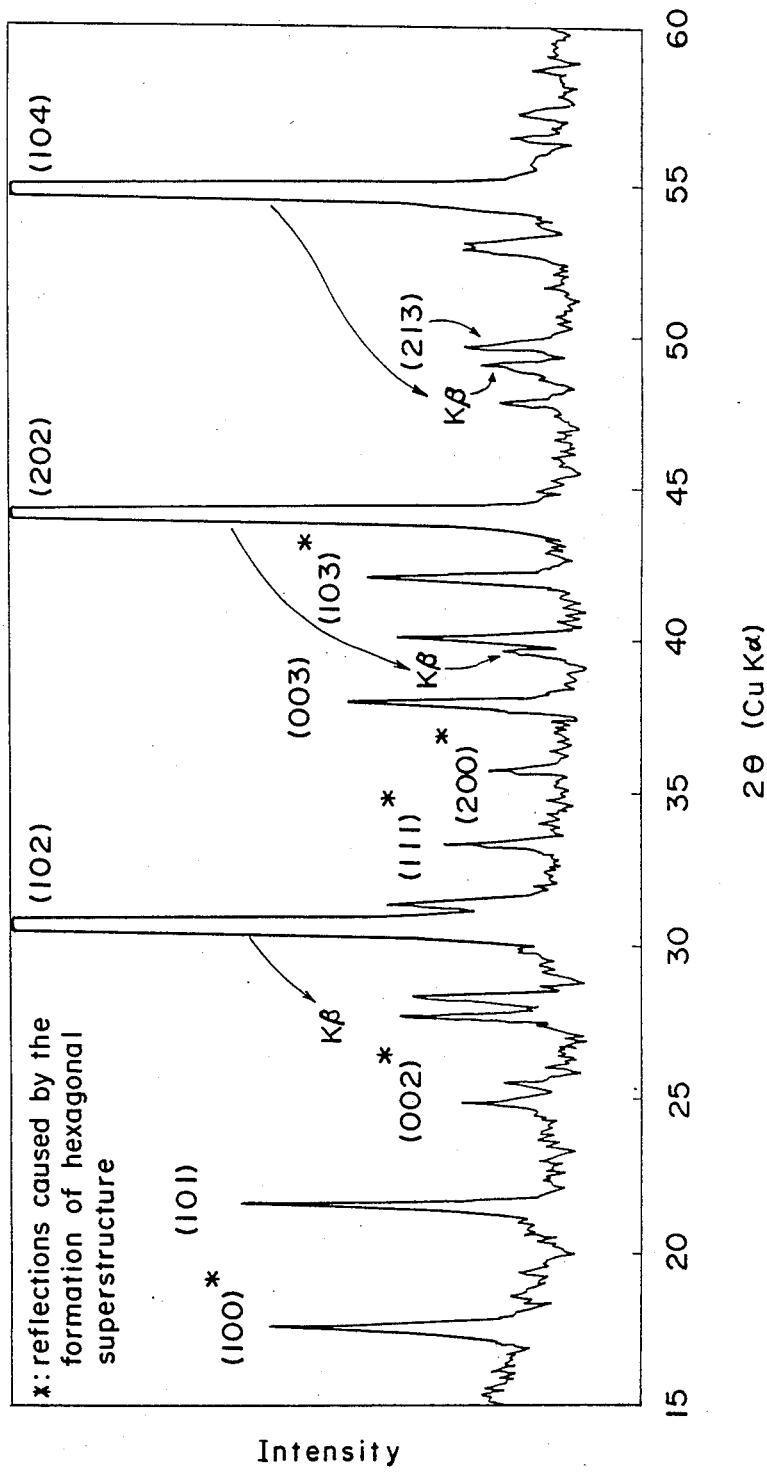
FIG. 3(a) is a graph showing X-ray diffraction patterns for $Ba(Mg_{\frac{1}{3}}Ta_{\frac{2}{3}})O_3$.

FIG. 3(b) shows X-ray diffraction patterns of powder of the specimen No. 3 having the composition of $Ba(Sn_{0.10}Mg_{0.29}Ta_{0.61})O_3$. From this figure, it will be seen that the X-ray patterns of $Ba(Sn_{0.10}Mg_{0.29}Ta_{0.61})O_3$ show disappearance of the diffraction peaks depending on the hexagonal super lattice which are observed in FIG. 3(a) showing X-ray diffraction patterns of $Ba(Mg_{\frac{1}{3}}Ta_{\frac{2}{3}})O_3$. This means that the composition $Ba(Sn_{0.10}Mg_{0.29}Ta_{0.61})O_3$ does not form a super structure and comes to be easily sintered as shown in FIGS. 4(a) and 4(b).

Figure 4A:
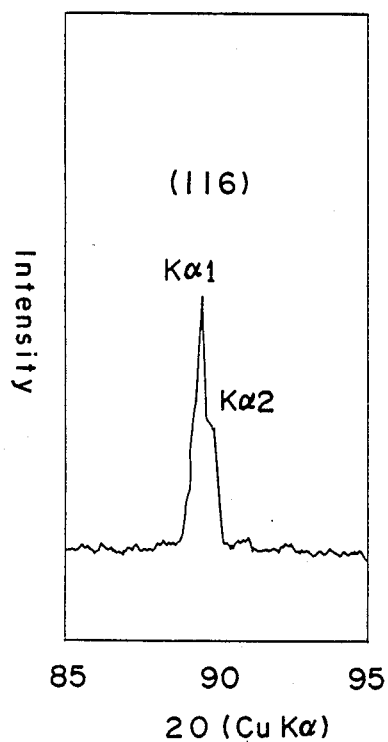
FIG. 4(a) is a graph showing X-ray diffraction patterns for $Ba(Mg_{\frac{1}{3}}Ta_{\frac{2}{3}})O_3$ around $2\theta = 90°$.
Figure 4B:
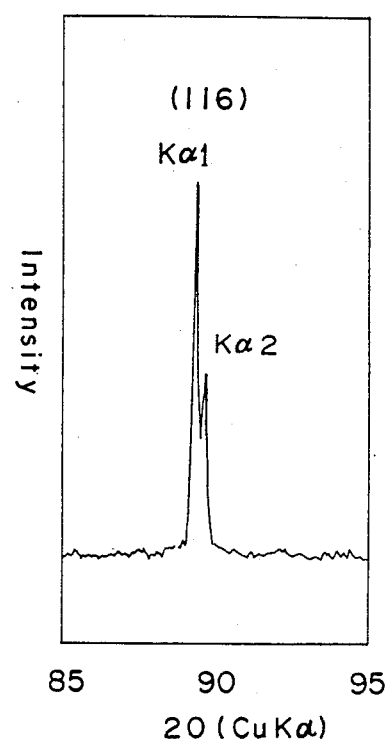

FIGS. 4(a) and 4(b) are x-ray diffraction patterns for $Ba(Mg_{\frac{1}{3}}Ta_{\frac{2}{3}})O_3$ and $Ba(Sn_{0.10}Mg_{0.29}Ta_{0.61})O_3$ around $2\theta=90°$, respectively, obtained by using Copper K radiation. Making comparison between FIGS. 4(a) and 4(b), it will be seen that the diffraction due to $K_{\alpha 1}$ spectrum and $K_{\alpha 2}$ spectrum are clearly separated into two peaks in the composition $Ba(Sn_{0.10}Mg_{0.29}Ta_{0.61})O_3$. Accordingly, it can be said that the composition $Ba(Sn_{0.10}Mg_{0.29}Ta_{0.61})O_3$ is superior to the composition $Ba(Mg_{1/3}Ta_{2/3})O_3$ in the crystallization.

EXAMPLE 2

Using highly purified (purity 99.8-99.9%) $BaCO_3$, $SnO_2$, $MgCO_3$, $Ta_2O_5$ and lanthanide oxides ($La_2O_3$, $CeO_2$, $Pr_2O_3$, $Nd_2O_3$, $Sm_2O_3$, $Dy_2O_3$, $Ho_2O_3$, $Er_2O_3$) as raw materials, there were prepared mixtures to produce ceramics each having a composition shown in Table 3. Each of the resultant mixtures of raw materials was treated in the same manner as disclosed in Example 1 to prepare specimens of dielectric ceramics. The properties of the resultant specimens were measured in the same manner as in Example 1. Results are shown in Table 3.

TABLE 3

| Specimen No. | $Ba(Sn_XMg_YTa_Z)$ $O_{7/2-X/2-3Y/2}$ | | | $Me_2O_3$ | | | | |
|---|---|---|---|---|---|---|---|---|
| | X | Y | Z | Me | content (mole %) | ε | Q | τf (ppm/°C.) |
| 1 | 0.04 | 0.31 | 0.65 | La | 0.1 | 23.6 | 8600 | 5 |
| 2 | 0.04 | 0.31 | 0.65 | La | 1.0 | 23.9 | 9100 | 7 |
| 3 | 0.04 | 0.31 | 0.65 | La | 10.0 | 24.2 | 8200 | 9 |
| 4* | 0.04 | 0.31 | 0.65 | La | 20.0 | 23.8 | 6600 | 12 |
| 5 | 0.14 | 0.31 | 0.55 | Ce | 0.1 | 23.7 | 8800 | 4 |
| 6 | 0.14 | 0.31 | 0.55 | Ce | 1.0 | 24.4 | 9100 | 5 |
| 7 | 0.14 | 0.31 | 0.55 | Ce | 10.0 | 24.4 | 8600 | 9 |
| 8* | 0.14 | 0.31 | 0.55 | Ce | 20.0 | 23.7 | 5900 | 15 |
| 9 | 0.10 | 0.29 | 0.61 | Pr | 0.1 | 24.8 | 9600 | 4 |
| 10 | 0.10 | 0.29 | 0.61 | Pr | 1.0 | 25.0 | 10600 | 6 |
| 11 | 0.10 | 0.29 | 0.61 | Nd | 10.0 | 25.1 | 9900 | 8 |
| 12* | 0.10 | 0.29 | 0.61 | Nd | 20.0 | 24.4 | 6800 | 16 |
| 13 | 0.14 | 0.27 | 0.59 | Sm | 0.1 | 25.0 | 11400 | −1 |
| 14 | 0.14 | 0.27 | 0.59 | Sm | 1.0 | 25.4 | 12500 | 0 |
| 15 | 0.14 | 0.27 | 0.59 | Sm | 10.0 | 25.5 | 9700 | 4 |
| 16* | 0.14 | 0.27 | 0.59 | Sm | 20.0 | 24.9 | 7300 | 7 |
| 17 | 0.10 | 0.25 | 0.65 | Sm | 0.1 | 26.7 | 8400 | 8 |
| 18 | 0.10 | 0.25 | 0.65 | Dy | 1.0 | 26.9 | 9700 | 9 |
| 19 | 0.10 | 0.25 | 0.65 | Ho | 10.0 | 26.8 | 8200 | 13 |
| 20* | 0.10 | 0.25 | 0.65 | Er | 20.0 | 26.3 | 5600 | 20 |
| 21 | 0.20 | 0.25 | 0.55 | La Ce | 0.05 0.05 | 25.5 | 9200 | −2 |
| 22 | 0.20 | 0.25 | 0.55 | Pr Nd | 0.5 0.5 | 25.7 | 9700 | 0 |
| 23 | 0.20 | 0.25 | 0.55 | Sm | 5.0 | 25.5 | 8300 | 3 |

TABLE 3-continued

| Specimen No. | $Ba(Sn_XMg_YTa_Z)$ $O_{7/2-X/2-3Y/2}$ | | | $Me_2O_3$ | | | | |
|---|---|---|---|---|---|---|---|---|
| | X | Y | Z | Me | content (mole %) | ε | Q | τf (ppm/°C.) |
| 24* | 0.20 | 0.25 | 0.55 | Dy Ho Er | 5.0 10.0 10.0 | 25.2 | 6600 | 8 |
| 25* | 0.10 | 0.35 | 0.55 | Sm | 1.0 | Not sintered | | |
| 26* | 0.18 | 0.35 | 0.47 | Sm | 1.0 | Not sintered | | |
| 27* | 0.02 | 0.29 | 0.69 | Sm | 1.0 | 26.0 | 4200 | 21 |
| 28* | 0.28 | 0.25 | 0.47 | Sm | 1.0 | 21.5 | 3300 | 6 |
| 29* | 0.12 | 0.19 | 0.69 | Sm | 1.0 | 30.4 | 3200 | 48 |
| 30* | 0.20 | 0.19 | 0.61 | Sm | 1.0 | 28.6 | 5300 | 34 |

As can be seen from the results shown in Table 3, the compositions according to the present invention have a high dielectric constant, a small temperature coefficient of resonant frequency and a high Q value. Also, it will be seen that the dielectric ceramic compositions according to the present invention can be improved in the quality factor (Q) by incorporation of 0.1 to 10 mole % of at least one lanthanide oxide into the composition of the $Ba(Sn_xMg_yTa_z)O_{7/2-x/2-3y/2}$ system.

EXAMPLE 3

Using highly purified (purity: 99.8-99.9%) $BaCO_3$, $SnO_2$, $MgCO_3$, $Ta_2O_5$, NiO and $Co_2O_3$ as raw materials, there were prepared mixtures to produce ceramics each having a composition shown in Table 4. Each resultant mixture of the raw materials was treated in the same manner as disclosed in Example 1 to prepare specimens of dielectric ceramics. The properties of the resultant specimens were measured in the same manner as in Example 1. Results are shown in Table 4.

TABLE 4

| Specimen No. | $Ba(Sn_XMg_YTa_Z)$ $O_{7/2-X/2-3Y/2}$ | | | Replaced amount (atom %) | ε | Q | τf (ppm/°C.) |
|---|---|---|---|---|---|---|---|
| 1 | 0.04 | 0.31 | 0.65 | Ni:35 | 23.7 | 8200 | 1 |
| 2 | 0.04 | 0.31 | 0.65 | Ni:70 | 23.9 | 7600 | −2 |
| 3* | 0.04 | 0.31 | 0.65 | Ni:95 | 23.9 | 5500 | −6 |
| 4 | 0.04 | 0.31 | 0.65 | Co:35 | 24.0 | 8100 | 0 |
| 5 | 0.04 | 0.31 | 0.65 | Ni:35 Co:35 | 24.7 | 7700 | −4 |
| 6* | 0.04 | 0.31 | 0.65 | Co:95 | 25.6 | 5400 | −9 |
| 7 | 0.14 | 0.31 | 0.55 | Ni:35 | 23.8 | 8100 | −2 |
| 8 | 0.14 | 0.31 | 0.55 | Ni:70 | 24.1 | 7500 | −5 |
| 9* | 0.14 | 0.31 | 0.55 | Ni:95 | Not sintered | | |
| 10 | 0.14 | 0.31 | 0.55 | Co:35 | 24.5 | 7800 | −2 |
| 11 | 0.14 | 0.31 | 0.55 | Ni:35 Co:35 | 25.6 | 7100 | −7 |
| 12* | 0.14 | 0.31 | 0.55 | Co:95 | Not sintered | | |
| 13 | 0.10 | 0.29 | 0.61 | Ni:35 | 24.1 | 8600 | 0 |
| 14 | 0.10 | 0.29 | 0.61 | Ni:70 | 23.7 | 8100 | −5 |
| 15* | 0.10 | 0.29 | 0.61 | Ni:95 | 23.6 | 6300 | −14 |
| 16 | 0.10 | 0.29 | 0.61 | Co:35 | 24.6 | 8400 | −1 |
| 17 | 0.10 | 0.29 | 0.61 | Ni:35 Co:35 | 24.9 | 7800 | −5 |
| 18* | 0.10 | 0.29 | 0.61 | Co:95 | 25.5 | 5700 | −13 |
| 19 | 0.14 | 0.27 | 0.59 | Ni:35 | 24.6 | 9900 | −6 |
| 20 | 0.14 | 0.27 | 0.59 | Ni:70 | 24.2 | 9200 | −11 |
| 21* | 0.14 | 0.27 | 0.59 | Ni:95 | 23.8 | 6100 | −18 |
| 22 | 0.14 | 0.27 | 0.59 | Co:35 | 25.2 | 9000 | −6 |
| 23 | 0.14 | 0.27 | 0.59 | Ni:35 Co:35 | 24.7 | 8300 | −9 |
| 24* | 0.14 | 0.27 | 0.59 | Co:95 | 25.2 | 6200 | −15 |
| 25 | 0.10 | 0.25 | 0.65 | Ni:35 | 26.5 | 8000 | 0 |
| 26 | 0.10 | 0.25 | 0.65 | Ni:70 | 25.9 | 7500 | −3 |
| 27* | 0.10 | 0.25 | 0.65 | Ni:95 | 25.1 | 6200 | −9 |
| 28 | 0.10 | 0.25 | 0.65 | Co:35 | 26.3 | 7700 | 2 |
| 29 | 0.10 | 0.25 | 0.65 | Ni:35 Co:35 | 25.4 | 7300 | −2 |

TABLE 4-continued

| Specimen No. | Ba(Sn$_x$Mg$_y$Ta$_z$)O$_{7/2-X/2-3Y/2}$ X | Y | Z | Replaced amount (atom %) | ε | Q | τf (ppm/°C.) |
|---|---|---|---|---|---|---|---|
| 30* | 0.10 | 0.25 | 0.65 | Co:95 | 25.3 | 6000 | −8 |
| 31 | 0.20 | 0.25 | 0.55 | Ni:35 | 25.4 | 8200 | −4 |
| 32 | 0.20 | 0.25 | 0.55 | Ni:70 | 25.2 | 7200 | −3 |
| 33* | 0.20 | 0.25 | 0.55 | Ni:95 | Not sintered | | |
| 34 | 0.20 | 0.25 | 0.55 | Co:35 | 24.9 | 8300 | −2 |
| 35 | 0.20 | 0.25 | 0.55 | Ni:35 Co:35 | 24.9 | 7100 | −2 |
| 36* | 0.20 | 0.25 | 0.55 | Co:95 | Not sintered | | |
| 37* | 0.10 | 0.35 | 0.55 | Ni:35 | Not sintered | | |
| 38* | 0.10 | 0.35 | 0.55 | Co:35 | Not sintered | | |
| 39* | 0.18 | 0.35 | 0.47 | Ni:35 | Not sintered | | |
| 40* | 0.18 | 0.35 | 0.47 | Co:35 | Not sintered | | |
| 41* | 0.02 | 0.29 | 0.69 | Ni:35 | 25.5 | 3300 | 15 |
| 42* | 0.02 | 0.29 | 0.69 | Co:35 | 25.8 | 3000 | 17 |
| 43* | 0.28 | 0.25 | 0.47 | Ni:35 | 22.1 | 2100 | −3 |
| 44* | 0.28 | 0.25 | 0.47 | Co:35 | 20.9 | 2300 | −5 |
| 45* | 0.12 | 0.19 | 0.69 | Ni:35 | 27.0 | 2400 | 35 |
| 46* | 0.12 | 0.19 | 0.69 | Co:35 | 27.3 | 2100 | 33 |
| 47* | 0.20 | 0.19 | 0.61 | Ni:35 | 26.2 | 3800 | 24 |
| 48* | 0.20 | 0.19 | 0.61 | Co:35 | 26.4 | 3700 | 25 |

As can be seen from the results shown in Table 4, the compositions according to the present invention have a high dielectric constant, a small temperature coefficient of resonant frequency and a high Q value. From the comparison between data in Table 2 and those in Table 4, it will be seen that the partial replacement of Mg in Ba(Sn$_x$Mg$_y$Ta$_z$)O$_{7/2-x/2-3y/2}$ with Ni and/or Co makes it possible to shift the temperature coefficient of resonant frequency to the negative side without deterioration of Q and the dielectric constant.

EXAMPLE 4

Using highly purified (purity: 99.8–99.9%) BaCO$_3$, SnO$_2$, MgCO$_3$, Ta$_2$O$_5$, NiO, Co$_2$O$_3$ and lanthanide oxides (La$_2$O$_3$, CeO$_2$, Pr$_2$O$_3$, Nd$_2$O$_3$, Sm$_2$O$_3$) as raw materials, there were prepared mixtures to produce ceramics each having a composition shown in Table 5. Each resultant mixture of the raw materials was treated in the same manner as disclosed in Example 1 to prepare specimens of dielectric ceramics. The properties of the resultant specimens were measured in the same manner as in Example 1. Results are shown in Table 5.

TABLE 5

| No. | Ba(Sn$_x$Mg$_y$Ta$_z$)O$_{7/2-X/2-3Y/2}$ X | Y | Z | Replaced amount (atom %) | Me$_2$O$_3$ Me | (mol %) | ε | Q | τf (ppm/°C.) |
|---|---|---|---|---|---|---|---|---|---|
| 1 | 0.04 | 0.31 | 0.65 | Ni:35 | La | 0.1 | 23.8 | 8600 | 1 |
| 2 | 0.04 | 0.31 | 0.65 | Ni:35 Co:35 | Ce | 1.0 | 25.0 | 9000 | −1 |
| 3 | 0.14 | 0.31 | 0.55 | Ni:35 | Pr | 0.1 | 23.9 | 8400 | 1 |
| 4 | 0.14 | 0.31 | 0.55 | Ni:35 Co:35 | Pr | 1.0 | 25.7 | 8300 | −1 |
| 5 | 0.10 | 0.29 | 0.61 | Ni:35 | Nd | 0.1 | 24.2 | 9000 | 1 |
| 6 | 0.10 | 0.29 | 0.61 | Ni:35 Co:35 | Sm | 1.0 | 25.2 | 9100 | −2 |
| 7 | 0.14 | 0.27 | 0.59 | Ni:35 | Sm | 0.1 | 24.8 | 11000 | −3 |
| 8 | 0.14 | 0.27 | 0.59 | Ni:35 Co:35 | Sm | 1.0 | 25.1 | 12000 | −3 |
| 9 | 0.10 | 0.25 | 0.65 | Ni:35 | La Ce | 0.05 0.05 | 26.5 | 8200 | 5 |
| 10 | 0.10 | 0.25 | 0.65 | Ni:35 Co:35 | Pr Nd | 0.5 0.5 | 26.6 | 9100 | 6 |
| 11 | 0.20 | 0.25 | 0.55 | Ni:35 | Sm Dy | 0.05 0.05 | 25.3 | 8800 | −3 |
| 12 | 0.20 | 0.25 | 0.55 | Ni:35 Co:35 | Ho Er | 0.5 0.5 | 25.5 | 9300 | −4 |

As can be seen from the results shown in Table 5, the compositions according to the present invention have a high dielectric constant, a small temperature coefficient of resonant frequency and a high Q value.

What we claim is:

1. A dielectric ceramic composition for microwave frequencies consisting essentially of a solid solution of BaO, SnO$_2$, MgO and Ta$_2$O$_5$, said solid solution being represented by the general formula:

Ba(Sn$_x$Mg$_y$Ta$_z$)O$_{7/2-x/2-3y/2}$ where x, y and z are mole fractions of the respective components, $0.04 \leq x \leq 0.26$, $0.23 \leq y \leq 0.31$, $0.51 \leq z \leq 0.65$, and $x+y+z=1.00$.

2. A dielectric ceramic composition for microwave frequencies according to claim 1 wherein x, y and z in said general formula take values within the following respective ranges: $0.04 \leq x \leq 0.20$, $0.25 \leq y \leq 0.31$, $0.55 \leq z \leq 0.65$.

3. A dielectric ceramic composition for microwave frequencies according to claim 2 wherein not more than 70 atomic percent of Mg is replaced with at least one Ni and Co.

4. A dielectric ceramic composition for microwave frequencies according to claim 3 wherein at least 35 atomic percent of Mg is replaced.

5. A dielectric ceramic composition for microwave frequencies consisting essentially of
a main component which is a solid solution of BaO, SnO$_2$, MgO and Ta$_2$O$_5$, said solid solution being represented by the general formula Ba(Sn$_x$Mg$_y$Ta$_z$)O$_{7/2-x/2-3y/2}$ where x, y and z are mole fractions of the respective components, $0.04 \leq x \leq 0.20$, $0.25 \leq y \leq 0.31$, $0.55 \leq z \leq 0.65$ and $x+y+z=1.00$; and
an additive composed of at least one lanthanide oxide, the content of said additive being not more than 10 mole percent in terms of Me$_2$O$_3$.

6. A dielectric ceramic composition for microwave frequencies according to claim 5 in which the content of said additive is at least 0.1 mole percent.

7. A dielectric ceramic composition for microwave frequencies according to claim 5 wherein not more than 70 atomic percent of Mg in the main component is replaced with at least one of Ni and Co.

8. A dielectric ceramic composition for microwave frequencies according to claim 7 in which the content of said additive is at least 0.1 mole percent.

9. A dielectric ceramic composition for microwave frequencies according to claim 8 wherein at least 35 atomic percent of Mg in the main component is replaced.

* * * * *